United States Patent Office 2,720,541
Patented Oct. 11, 1955

2,720,541
MANUFACTURE OF ARYLAMIDES FROM BETA-NAPHTHYLAMINE

Martin E. Friedrich, Penns Grove, N. J., assignor to E. I. du Pont de Nemours & Company, Wilmington, Del., a corporation of Delaware No Drawing. Application March 5, 1952, Serial No. 275,025

11 Claims. (Cl. 260—560)

This invention relates to the manufacture of arylamides from β-naphthylamine and various aromatic carboxylic acids, and has as its principal object an improvement in the process of manufacture, whereby health hazards are minimized to those engaged in the process as well as to those using the product.

As is well known, β-naphthylamine is a physiologically hazardous chemical, having a tendency to encourage the development of cancer in persons who inhale its vapors or get the substance on their skin repeatedly for long periods of time. On the other hand, this compound is an important intermediate in the production of dyes and other chemicals, and finds extensive utility in the manufacture, for instance, of 3-hydroxy-2-naphthoic acid-β-naphthylamide or similar arylides of other aromatic carboxy acids.

The manufacture of such arylides is generally achieved by reacting together β-naphthylamine, the selected carboxy-acid, and an acid condensing agent, for instance phosphorus trichloride in an inert solvent or diluent, for instance toluene or xylene. It has been observed, however, that the reaction does not generally go to completion, but leaves instead, as a rule, a small percentage of unreacted β-naphthylamine. Hitherto, it has been customary to remove this residual amine by washing the filter cake thoroughly with organic solvents and water, and drying. This reduces the health hazard as far as the user of the product is concerned, but the operations themselves of filtering, drying and filtrate removal still remain hazardous to those engaged in the manufacture of these arylides.

Now according to my invention, the aforementioned health hazard is minimized, if not entirely eliminated, by modifying the manufacture so as to leave no appreciable quantities of free β-naphthylamine in the reaction mass, prior to filtration. For this purpose, the process of synthesis is broken up into two stages. In the first stage, the amine, carboxy-acid, acid-condensing agent and solvent are heated together, generally at reflux, to a point where no further hydrochloric acid is eliminated, which indicates that the reaction has proceeded as far as it can under the given conditions. In the second stage, the reaction mass is made slightly alkaline with aqueous alkali, and a reagent is added to consume the residual beta-naphthylamine by forming an innocuous compound therewith.

This reagent is preferably an organic acid-anhydride or an organic acid chloride, so that its reaction with β-naphthylamine will produce an amide. But it may be selected so as to produce additional quantities of the same amide as was obtained in the first stage thereby increasing the overall yield of the desired product. For instance, in the manufacture of 3-hydroxy-2-naphthoic acid-β-naphthylamide, the added reagent may be 3-hydroxy-2-naphthoyl chloride. Or it may be an anhydride or chloride of an entirely different acid, in which event the amide formed in the second stage is different from the principal amide, and may be either extracted from the principal product by suitable solvents or left therein as an inert diluent. For instance, where the principal arylide aimed at is that of 3-hydroxy-2-naphthoic acid, which of course is intended as a coupling component for azo dyes, a diluent amide which is free of auxochromic groups (and has no tendency to couple) would not affect materially the merits or quality of the principal product.

As illustrations of such suitable reagents other than 3-hydroxy-2-naphthoyl chloride, may be mentioned acetic anhydride, benzoyl chloride, m-chlorosulfonyl-benzoyl chloride, phthalic anhydride, p-nitro-benzoyl chloride, and numerous other compounds of the same classes.

The remarkable factor in my invention is that the added anhydride or acid chloride will essentially exhaust the residual quantities of β-naphthylamine in an aqueous mass, whereas in the first stage, prior to alkalization with aqueous caustic, the joint efforts of the initial carboxy acid and the acid-condensing agent failed to remove these residual quantities of the amine.

Without limiting my invention, the following examples are given to illustrate my preferred mode of operation. Parts mentioned are by weight.

Example 1

100 parts of 3-hydroxy-2-naphthoic acid, 76 parts of beta naphthylamine and 800 parts of xylene, were agitated in a flask equipped with a condenser. 30.2 parts of phosphorus trichloride were added at 60°–70° C. during one hour. The charge was then heated at the reflux point until the evolution of hydrochloric acid ceased— approximately 2 hours. It was then cooled to 30° C. and made alkaline (to Brilliant Yellow) with dilute aqueous sodium carbonate solution. Analysis for beta naphthylamine indicated that 2.1% of that charged, was present in the xylene layer.

15 parts of acetic anhydride were then added and the mass was stirred for 30 minutes while maintaining its alkalinity to Brilliant Yellow with additional quantities of dilute sodium carbonate, as needed. At the end of this period the beta naphthylamine content in the xylene layer dropped to approximately 0.01% of the quantity initially employed. The charge was then filtered, and the filter cake was washed with water and xylene and dried.

Example 2

150 parts of 3-hydroxy-2-naphthoic acid, 114 parts of beta naphthylamine and 1500 parts of toluene were agitated in a flask equipped with a condenser. 45.1 parts of phosphorus trichloride were added at 65°–74° C. during one hour. The mass was then heated at the reflux point until evolution of hydrogen chloride gas ceased—approximately 16 hours. It was then cooled to 40° C., and alkalized (to Brilliant Yellow) with 10% aqueous soda ash solution. Analysis for beta naphthylamine indicated that 2.8% of that charged was present in the toluene layer.

Addition of 12 parts of benzoyl chloride while maintaining alkalinity as in Example 1 and stirring for 30 minutes, reduced the beta naphthylamine in the toluene layer to approximately 0.01% of that charged. The mass was then filtered, and the arylide was washed with toluene and water and dried.

In other experiments following the same procedure but replacing the 12 parts of benzoyl chloride by 10 parts of m-chlorsulfonyl-benzoyl chloride or 10 parts of furoyl chloride, similar results were obtained.

Example 3

150 parts of salicylic acid, 750 parts of toluene and 155.4 parts of beta naphthylamine were agitated in a flask equipped with a condenser. 61.6 parts of phosphorus trichloride were added during one hour at 65°–80° C. A thick but easily stirrable white mass was obtained. The mass was refluxed for 8 hours, cooled to 80° C. and made alkaline with aqueous soda ash solution. Analysis for beta naphthylamine indicated that 4.4% of that charged was present in the toluene layer.

Addition of 25 parts of acetic anhydride followed by stirring for 40 minutes while maintaining alkalinity with aqueous soda ash solution reduced the beta naphthylamine in the toluene to 0.05% of that charged. The reaction mass was filtered, and the product, salicyl beta napthylamide, was washed with water and toluene and dried.

Example 4

150 parts of para nitro benzoic acid, 750 parts of toluene and 128.4 parts of beta naphthylamine were agitated in a flask equipped with a condenser. 50.7 parts of phosphorus trichloride were added during one hour at 65°–70° C. giving a thick but easily stirrable yellow mass. The mass was refluxed for 8 hours, cooled to 30° C. and alkalized with aqueous soda ash solution as in Example 1. Analysis for beta naphthylamine in the toluene layer showed that 8.8% of that charged was present.

Addition of a solution of 25 parts of para nitro benzoyl chloride in 100 parts of toluene followed by stirring for 20 minutes while keeping the mass alkaline to Brilliant Yellow with 5% aqueous soda ash solution, reduced the beta naphthylamine in the toluene layer to 0.01% of that charged. The reaction mass was filtered, and the product, para nitro benzoyl-beta naphthylamine, was washed with water and toluene.

It will be noted that in this example the reagent added in the second stage was of such a nature as to yield the same amide as was obtained in the first stage, thereby increasing the overall yield of the desired product. A similar increase in yield may be obtained in Examples 1 and 2 by using in the second stage, in lieu of acetic anhydride or benzoyl chloride, 7 to 10 parts of 3-hydroxy-2-napthoyl chloride.

It will be understood that the details of the above examples may be varied within the skill of those engaged in this art. Thus, in lieu of sodium carbonate in the neutralization steps, other convenient alkalis may be employed, for instance potassium carbonate or sodium or potassium bicarbonate.

In lieu of the specified organic solvents or diluents, other convenient inert organic liquids may be employed, for instance monochlorobenzene, o-dichlorobenzene, nitro-benzene or tetrachlorethane.

In lieu of phosphorus trichloride, phosphorus oxychloride or thionyl chloride may be employed as condensing agents. And in lieu of the particular amides named in the examples, the amides of β-naphthylamine and benzoic acid, 2-naphthoic acid, or other carboxy acids of the benzene and naphthalene series may be manufactured by the aid of this invention.

I claim as my invention:

1. In the process of synthesizing β-napthylamides of aromatic carboxylic acids by reacting the latter with β-naphthylamine and an acid condensing agent in an inert organic liquid, the improvement comprising the steps of first permitting the reaction to proceed until active reaction is no longer observed, then alkalizing the reaction mass with aqueous alkali, and then adding to the reaction mass an amide-forming reagent from the group consisting of organic acid anhydrides and organic acid chlorides to consume the residual quantities of β-naphthylamine in the reaction mass.

2. In the process of synthesizing the β-naphthylamide of 3-hydroxy-2-naphthoic acid by reacting the latter with β-naphthylamine and an acid condensing agent in an inert organic diluent, the improvement comprising the steps of first permitting the reaction to proceed until active reaction is no longer observed, then alkalizing the reaction mass by the aid of aqueous alkali and then adding to the reaction mass an amide-forming reagent from the group consisting of organic acid anhydrides and organic acid chlorides to consume the residual quantities of β-naphthylamine in the reaction mass.

3. A process as in claim 1, the reagent added after alkalization being the chloride of the same aromatic carboxylic acid as employed for the principal synthesis with β-naphthylamine.

4. A process as in claim 1, the reagent added after alkalization being one adapted to yield a naphthylamide which is readily removable from the principal reaction product.

5. A process as in claim 2, the reagent added after alkalization being 3-hydroxy-2-naphthoyl chloride.

6. A process as in claim 2, the reagent added after alkalization being benzoyl chloride.

7. A process as in claim 2, the reagent added after alkalization being acetic anhydride.

8. A process as in claim 2, the reagent added after alkalization being phthalic anhydride.

9. A process as in claim 1, reaction mass being maintained alkaline to Brilliant Yellow during the addition of the amide-forming reagent, and the reaction mass being then filtered and washed to recover the principal reaction product.

10. A process for converting beta naphthylamine into an amide thereof with substantially complete consumption of said beta naphthylamine whereby to reduce the health hazard of subsequent handling of the reaction mass in the recovery stages, which comprises reacting said beta-naphthylamine with carboxylating agents in two separate stages, the first of said stages being an acid stage and being characterized by reaction with not less than the theoretical quantity of an aromatic carboxylic acid and an acid chlorinating agent in an inert organic liquid at a temperature above 110° C., said first stage being allowed to proceed until active reaction is no longer observed, and the second stage being an alkaline stage and comprising reaction with an added quantity of a carboxylating agent in the presence of aqueous alkali and at a temperature not exceeding 40° C.

11. A process as in claim 10, the carboxylating agent in the second stage being a member of the group consisting of the anhydrides and chlorides of aliphatic and aromatic carboxylic acids.

References Cited in the file of this patent

UNITED STATES PATENTS

| | | |
|---|---|---|
| 1,101,111 | Zitscher | June 23, 1914 |
| 1,762,474 | Higgins | June 10, 1930 |
| 2,410,397 | Weis et al. | Oct. 29, 1946 |